United States Patent [19]

Kashiwazaki et al.

[11] Patent Number: 5,552,192
[45] Date of Patent: Sep. 3, 1996

[54] COLOR FILTER AND METHOD FOR MANUFACTURING IT

[75] Inventors: Akio Kashiwazaki; Hiroshi Sato, both of Yokohama; Katsuhiro Shirota, Inagi; Hideto Yokoi, Yokohama; Shoji Shiba, Sagamihara, all of Japan

[73] Assignee: Canon Kabushiki Kaisha, Tokyo, Japan

[21] Appl. No.: 357,331

[22] Filed: Dec. 16, 1994

[30] Foreign Application Priority Data

Dec. 21, 1993 [JP] Japan ................... 5-322132

[51] Int. Cl.$^6$ ........................................ B05D 3/06
[52] U.S. Cl. ................. 427/492; 427/493; 427/511; 427/512; 427/514; 427/165; 427/168
[58] Field of Search .................. 427/492, 493, 427/510, 511, 512, 514, 164, 165, 168, 169; 252/582, 583, 586; 345/50, 88; 359/68

[56] References Cited

U.S. PATENT DOCUMENTS

| | | | |
|---|---|---|---|
| 4,313,124 | 1/1982 | Hara .................... | 346/140 R |
| 4,345,262 | 8/1982 | Shirato et al. ........ | 346/140 R |
| 4,418,284 | 11/1983 | Ogawa et al. ......... | 250/578 |
| 4,459,600 | 7/1984 | Sato et al. ............ | 346/140 R |
| 4,463,359 | 7/1984 | Ayata et al. ........... | 346/1.1 |
| 4,558,333 | 12/1985 | Sugitani et al. ....... | 346/140 R |
| 4,608,577 | 8/1986 | Hori .................... | 346/140 R |
| 4,698,113 | 10/1987 | Ogawa ................. | 156/275.7 |
| 4,723,129 | 2/1988 | Endo et al. ........... | 346/1.1 |
| 4,740,796 | 4/1988 | Endo et al. ........... | 346/1.1 |
| 4,818,075 | 4/1989 | Takao et al. .......... | 350/339 F |
| 4,846,556 | 7/1989 | Haneda ................ | 350/317 |
| 4,864,324 | 9/1989 | Shirota et al. ......... | 346/1.1 |
| 4,965,612 | 10/1990 | Sakaki et al. .......... | 346/1.1 |
| 4,981,614 | 1/1991 | Miyazaki et al. ..... | 252/587 |
| 4,995,705 | 2/1991 | Yoshinaga et al. .... | 350/350 |
| 5,011,626 | 4/1991 | Yoshinaga et al. .... | 252/299.5 |
| 5,039,208 | 8/1991 | Ohnishi et al. ........ | 359/100 |
| 5,079,214 | 1/1992 | Long et al. ........... | 503/227 |
| 5,190,794 | 3/1993 | Yoshino et al. ....... | 427/162 |
| 5,278,009 | 1/1994 | Iida et al. ............. | 430/7 |
| 5,281,450 | 1/1994 | Yaniv .................. | 427/165 |
| 5,317,434 | 5/1994 | Ohara .................. | 359/68 |
| 5,340,619 | 8/1994 | Chen et al. ........... | 427/165 |
| 5,358,558 | 10/1994 | Yamamoto et al. ... | 106/22 R |
| 5,418,094 | 5/1995 | Sato et al. ............ | 430/7 |
| 5,420,708 | 5/1995 | Yokoyama et al. ... | 359/67 |

FOREIGN PATENT DOCUMENTS

| | | |
|---|---|---|
| 0400738 | 12/1990 | European Pat. Off. . |
| 0552035 | 7/1993 | European Pat. Off. . |
| 54-56847 | 5/1979 | Japan . |

(List continued on next page.)

OTHER PUBLICATIONS

Abstract of JP 4-317007.
Patent Abstracts of Japan, vol. 17, No. 526 (Sep. 1993) (P-1617).
Patent Abstracts of Japan, vol. 17, No. 703 (Dec. 1993) (P-1666).
Abstract of 1-235903.
Abstract of 2-228605.
Patent Abstracts of Japan, vol. 13, No. 37 (Jan. 1989) (P-819).

(List continued on next page.)

Primary Examiner—Michael Lusignan
Assistant Examiner—Erma Cameron
Attorney, Agent, or Firm—Fitzpatrick, Cella, Harper & Scinto

[57] ABSTRACT

A method for manufacturing a color filter which comprises arranging colorants on a substrate by using inks capable of curing by the application of energy, said method comprising (1) a step of imparting, to the substrate, the inks capable of curing by the application of energy to form colored portions, (2) a step of applying the energy to the substrate to partially cure the colored portions, (3) a step of forming an energy-curable resin layer on the partially cured colored portions, and (4) a step of curing the partially cured colored portions and the resin layer by the application of the energy.

23 Claims, 3 Drawing Sheets

FOREIGN PATENT DOCUMENTS

| | | |
|---|---|---|
| 59-075205 | 4/1984 | Japan . |
| 59-123670 | 7/1984 | Japan . |
| 59-138461 | 8/1984 | Japan . |
| 60-71260 | 4/1985 | Japan . |
| 61-77014 | 4/1986 | Japan . |
| 63-235901 | 9/1988 | Japan . |
| 63-294503 | 12/1988 | Japan . |
| 01217320 | 8/1989 | Japan . |
| 01235903 | 9/1989 | Japan . |
| 02228605 | 9/1990 | Japan . |
| 3-10220 | 1/1991 | Japan . |
| 04317007 | 11/1992 | Japan . |
| 04349401 | 12/1992 | Japan . |
| 173010 | 7/1993 | Japan . |
| 05288913 | 11/1993 | Japan . |
| WO9324240 | 12/1993 | WIPO . |

OTHER PUBLICATIONS

Patent Abstracts of Japan, vol. 8, No. 183 (Aug. 1984) (P–296).

Patent Abstracts of Japan, vol. 13, No. 530 (Nov. 1989) (P–966).

Patent Abstracts of Japan, vol. 16, No. 382 (Aug. 1992) (P–1403).

Patent Abstracts of Japan, vol. 16, No. 197 (May 1992) (P–1350).

COLOR FILTER AND METHOD FOR MANUFACTURING IT

BACKGROUND OF THE INVENTION

1. Field of the Invention

The present invention relates to a method for manufacturing a color filter suitable for a color liquid crystal display which can be used in a color television, a personal computer or the like. More specifically, it relates to a method for manufacturing a color filter for liquid crystal display manufactured by the utilization of an ink jet printing technique.

2. Related Background Art

In recent years, there has been a tendency that the demand of liquid crystal displays, particularly color liquid crystal displays increases with the development of personal computers, particularly portable personal computers. However, for the further spread of the liquid crystal displays, it is necessary to lower their costs, and particularly with regard to the color filter which largely occupies the cost of each display, request for its cost reduction increases. In order to meet the required characteristics of the color filter and to satisfy the above-mentioned demand, various attempts have been heretofore made, but any method which can meet all of the required characteristics has not been established so far. Some methods for manufacturing the color filter will be described below.

A first method which has most often been used is a dyeing method. This dyeing method comprises coating a glass substrate with an aqueous polymer material which is a dyeing material, patterning the material into a desired shape by a photolithography process, and then immersing the thus obtained pattern in a dyeing bath to obtain a colored pattern. This operation is repeated three times to form the colored layers of Red (R), Green (G) and Blue (B).

A second method is a pigment dispersion method, which is now being replaced with the above-mentioned dyeing method. This pigment dispersion method comprises first forming, on a substrate, a photosensitive resin layer in which a pigment is dispersed, and then patterning the resin layer to obtain a single-colored pattern. Next, this process is repeated three times to form colored layers having three colors of R, G and B.

A third method is an electrodeposition method. This method comprises first patterning transparent electrodes on a substrate, and then immersing it in an electrodeposition coating solution containing a pigment, a resin, an electrolyte and the like to electrodeposit a first color. This process is repeated three times to form colored layers of R, G and B, and in the last step, these layers are calcined.

A fourth method comprises dispersing a pigment in a thermosetting resin, repeating a printing operation three times with the colors of R, G and B, and then thermosetting the colored resin layers to form colored layers. In each of these methods, a protective layer is usually formed on the colored layers.

A point which is common to these methods is that a similar process is required to be repeated three times to give the three colors of R, G and B, which increases the cost. In addition, these methods having many steps lead to the deterioration of a yield. Moreover, in the electrodeposition method, the formable patterns are limited, and so it is difficult to apply this method to TFT by an existent technique. The printing method has a drawback that a resolution and a smoothness are poor, and so it is not suitable for the formation of a pattern having a fine pitch.

In order to overcome these drawbacks, techniques for manufacturing a color filter by the use of an ink jet system have been developed, and these techniques have been described in Japanese Patent Application Laid-Open Nos. 59-75205, 63-235901 and 1-217320. However, a sufficiently satisfactory method has not been obtained yet.

SUMMARY OF THE INVENTION

Under such circumstances, an object of the present invention is to provide a method for manufacturing a highly precise and reliable color filter in which necessary characteristics such as a heat fastness, a solvent fastness and a resolution given by a conventional method are kept up and which can prevent color mixing, color unevenness and color skip and also prevent film peeling between a colored portion and a protective layer and the generation of cracks in the protective layer. Above all, an object of the present invention is to provide a color filter for liquid crystal display at low cost in which a process for its manufacture is shortened by the use of an ink jet system.

The above-mentioned object can be achieved by the present invention.

According to the present invention, there is provided a method for manufacturing a color filter which comprises arranging colorants on a substrate by using inks capable of curing by the application of energy, comprising (1) a step of imparting, to the substrate, the inks capable of curing by the application of energy to form colored portions, (2) a step of applying the energy to the substrate to partially cure the colored portions, (3) a step of forming an energy-curable resin layer on the partially cured colored portions, and (4) a step of curing the partially cured colored portions and the resin layer by the application of the energy, said energy being light or heat, said inks comprising an ultraviolet-curing resin, a residual ratio of uncured portions of the inks in the step (2) being in the range of 0.5 to 10%, the impartment of the inks to the substrate being carried out by an ink jet system.

According to the present invention, there is provided further a method for manufacturing a color filter which comprises arranging colorants on a substrate by using inks capable of curing by the application of energy, comprising (1) a step of imparting, to the substrate provided with a resin layer, the inks capable of curing by the application of energy to form colored portions, (2) a step of applying the energy to the substrate to partially cure the colored portions, (3) a step of forming an energy-curable resin layer on the partially cured colored portions, and (4) a step of curing the partially cured colored portions and the resin layer by the application of the energy, said energy being light or heat, said inks comprising an ultraviolet-curing resin, a residual ratio of uncured portions of the inks in the step (2) being in the range of 0.5 to 10%, the impartment of the inks to the substrate being carried out by an ink jet system.

According to the present invention, there is still provided a color filter prepared by the methods described above.

DETAILED DESCRIPTION OF THE PREFERRED EMBODIMENTS

The present inventors have found that when colored portions are formed by the use of energy-curing inks in order to form a color filter and when a protective layer is formed after the complete curing of the colored portions, film peeling tends to occur between the colored portions and the protective layer, or cracks take place in the protective layer. Thus, for the purpose of overcoming this drawback, the present invention has now been attained.

Now, the present invention will be described in detail with reference to attached drawings.

FIGS. 1A to 1D show a manufacturing method of a color filter for liquid crystal display in the present invention.

In the present invention, as a substrate 1, a glass substrate is usually used. However, the glass substrate is not restrictive, and any material can be used as the substrate, so long as it has necessary characteristics such as transparency and mechanical strength which the color filter for liquid crystal display should have.

Figure 1A:
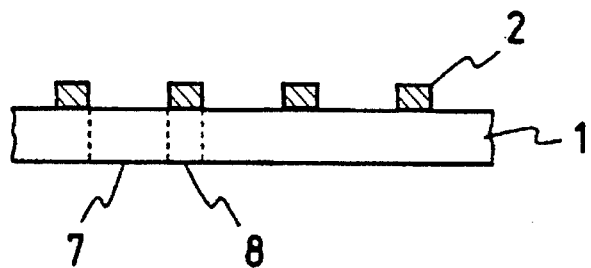
FIGS. 1A to 1D show a flow sheet of a method for the manufacturing of a color filter for liquid crystal display according to the present invention.

In the first place, a glass substrate 1 provided with black matrices 2 is prepared (FIG. 1A). In this case, as a technique for forming the black matrices, there is a method which comprises forming a metal thin film by sputtering or vapor deposition, and then performing patterning in accordance with a photolithographic process.

Figure 1B:
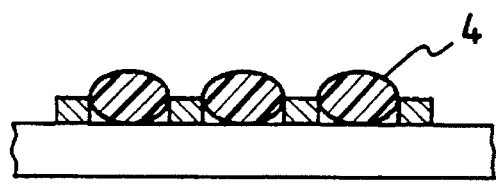

Next, as shown in FIG. 1B, inks 4 of R, G and B are imparted by the utilization of an ink jet system so that light-transmittable portions 7 (refer to FIG. 1A) between the black matrices 2 constituting shade portions 8 (refer to FIG. 1A) may be filled with the inks 4. This pattern of R, G and B may be formed by a technique such as the so-called casting. Furthermore, it is preferable that printing is done so that the respective inks may not overlap each other on the black matrices 2.

As the ink which can be used in the present invention, dyestuff-type and pigment-type inks are both usable, so long as they can cure by the application of energy such as light or heat. In addition, both of the liquid inks and solid inks are also usable. It is essential that the ink contains a component which can cure by light, heat or a combination of light and heat, and as such a component, there can be used various commercially available resins and curing agents, so long as they do not bring about a problem such as cohesion in the ink. Typical examples of the resins include acrylic resins, epoxy resins and melamine resins.

As the ink jet system, there can be used a bubble jet type using an electricity-heat converter as an energy-generating element and a piezo jet type using a piezo-electric element. A colored area and a colored pattern can be optionally set.

Figure 1C:
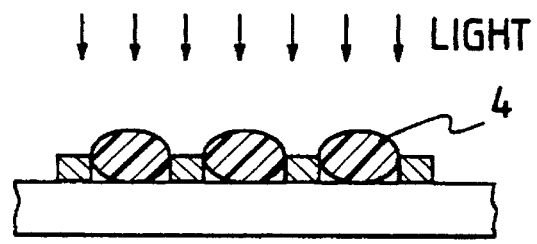
Figure 1D:
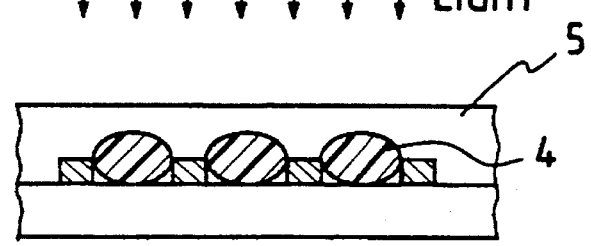

Next, as shown in FIG. 1C, the colored portions are partially cured by light irradiation, a heat treatment or a combination of the light irradiation and the heat treatment, and as shown in FIG. 1D, a resin composition is then applied on the colored portions. Afterward, the colored portions and the resin composition are cured by the light irradiation and/or the heat treatment to form a protective layer 5, thereby manufacturing a color filter.

In the present invention, when the colored portions are partially cured, a residual ratio of uncured portions in the colored portions is preferably in the range of 0.5 to 10%, more preferably 0.5 to 5%. If the residual ratio of the uncured portions is more than 10%, the colored portions are dissolved by the resin composition applied to form the protective layer, so that the ink is mixed with the adjacent ink having a different color. Conversely, if it is less than 0.5%, the protective layer may shrink owing to the curing, so that the protective layer tends to peel or crack.

This residual ratio of the uncured portions can be obtained from a relation with a crosslinking ratio, and it can be calculated by measuring the absorption of crosslinked portions of the resin by IR, NMR or the like. If a monomer is used as the curing component, its cured layer is washed with an organic solvent such as an alcohol, and a weight change of the layer is calculated to measure the residual ratio.

Next, as the protective layer 5, there can be used a resin material which can be cured by light irradiation, a heat treatment or a combination of the light irradiation and the heat treatment, or an inorganic film formed by vapor deposition or sputtering. Thus, as the protective layer, any material can be used, so long as it does not impede the transparency of the obtained color filter, and can withstand subsequent steps such as an ITO formation process and an orientation film formation process.

FIGS. 2A to 2E show another manufacturing method of a color filter for liquid crystal display in the present invention.

Figure 2A:
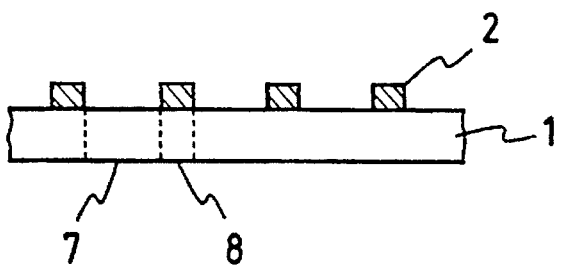
FIGS. 2A to 2E show a flow sheet of another method for the manufacturing of the color filter for liquid crystal display according to the present invention.
Figure 2B:
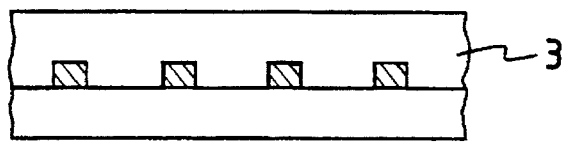
Figure 2C:
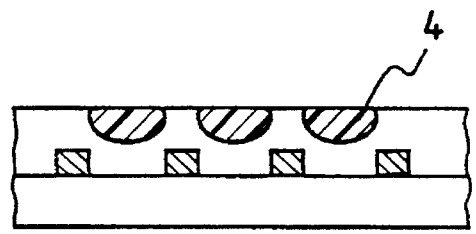

In the first place, a glass substrate 1 provided with black matrices 2 is prepared (FIG. 2A), and the glass substrate 1 is then coated with a resin composition to form a resin layer 3 (FIG. 2B). This resin layer has a function for regulating the spread of an impacted ink to a predetermined diameter, and it is selected from materials having a withstanding property to a process such as a heat fastness and the like.

As the above-mentioned resin composition, any resin composition can be used, so long as it has a moderate water repellency and an oil repellency and it is excellent in a withstanding property to a process such as a heat fastness. For example, acrylic resins, epoxy resins and imide resins can be suitably used. The resin composition may be heat and light-curing type, and in this case, the curing may be carried out after printing.

The resin composition can be applied by a means such as spin coating, roll coating, bar coating, spray coating or dip coating.

Figure 2D:
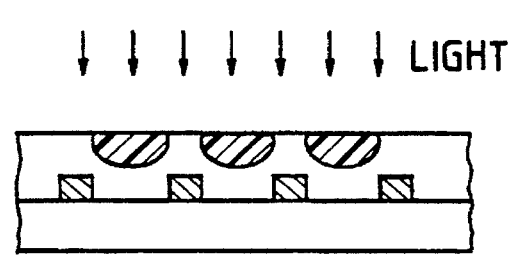
Figure 2E:
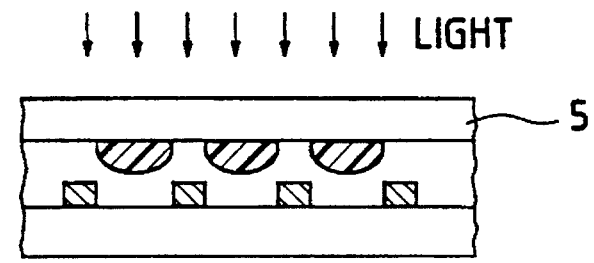

To this resin layer 3, inks 4 are imparted by the utilization of the ink jet system (FIG. 2C), and the colored portions are then partially cured by light irradiation, a heat treatment or a combination of the light irradiation and the heat treatment (FIG. 2D). Next, the resin composition is applied onto the colored portions, and the colored portions and the resin layer are then cured by the light irradiation and/or the heat treatment to form a protective layer 5 (FIG. 2E), thereby manufacturing a color filter. Reference numeral 7 denotes light-transmittable portions and reference numeral 8 denotes shade portions.

Figure 3:
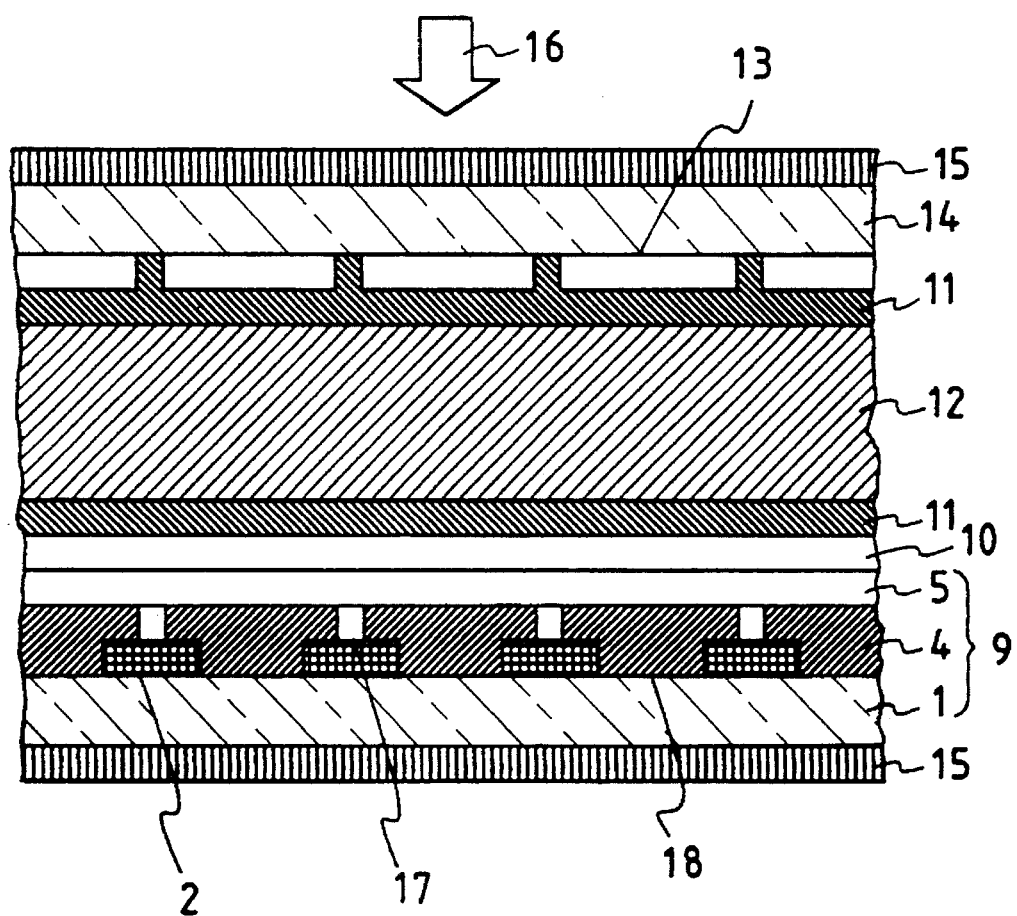
FIG. 3 is a sectional view showing the constitution of a liquid crystal panel.

FIG. 3 shows a sectional view of a TFT color liquid crystal panel into which the color filter of the present invention is incorporated.

The color liquid crystal panel can be formed by combining a color filter 9 with opposite substrate 14, and then enclosing a liquid crystal compound 12 therebetween. On the inside of the one substrate of the liquid crystal panel, TFT (not shown) and transparent pixel electrodes 13 are formed in the state of matrices. A color filter 9 including substrate 1, is arranged at a position opposite to the pixel electrodes, and all over the color filter 9, a transparent common electrode 10 is formed. Moreover, on the surfaces of both the substrates 1 and 14, orientation films 11 are formed and then subjected to a rubbing treatment to arrange liquid crystal molecules in a certain direction. Furthermore, polarizing plates 15 adhere to the outsides of the respective glass substrates 1 and 14, and the liquid crystal compound 12 is filled into the space (about 2 to 5 µm) between these glass substrates. As a back light 16, a combination of fluorescent lamps (not shown) and a scattering plate (not shown) is used, and display is carried out by utilizing the liquid crystal compound as a light shutter for changing the transmittance of the back light. Reference numeral 2 denotes a black matrix, 4 an ink receiving layer, 5 a protective layer, 17 a non-colored portion and 18 a colored portion, respectively.

Next, the present invention will be described in detail with reference to examples.

EXAMPLE 1

A glass substrate 1 provided with black matrices 2 was spin-coated with a self-crosslinkable thermosetting type resin composition comprising an acryl-silicon graft polymer so as to make a thickness of a film of 2 µm, and then dried by air. Next, the resin film was colored in a matrix pattern of R, G and B by an ink jet head.

In this example, there were used inks each comprising a R, G or B dye, a water-soluble organic solvent, water, 5% by weight of an acrylic acid monomer and 1% by weight of bisazide as photosetting components based on a total weight of the ink.

After the coloring with these inks, the resin film was subjected to overall exposure by UV irradiation and a heat treatment at 230° C. for 1 hour to partially cure the colored portions and the resin composition. At this time, a residual ratio of uncured portions in the colored portions was 3%.

The thus partially cured resin film was further spin-coated with a two-pack thermosetting type resin material so as to make a film thickness of 1 µm, and a heat treatment was then carried out at 230° C. for 30 minutes to cure the colored portions and the resin layer, thereby preparing a color filter for liquid crystal display.

The thus prepared color filter for liquid crystal display was observed by an optical microscope, and as a result, defects such as color mixing, color unevenness, and the peeling and cracks of the protective layer were not confirmed.

EXAMPLE 2

The same procedure as in Example 1 was carried out except that there were used inks each comprising a R, G or B pigment, water, a water-soluble organic solvent and 3% by weight of an self-crosslinkable thermosetting type resin composition comprising an acryl-silicon graft polymer as a thermosetting component, and after printing, colored portions and the resin composition were partially cured at 230° C. for 1 hour by a heat treatment, thereby preparing a color filter. At this time, a residual ratio of uncured portions in the colored portions was 4%.

The thus prepared color filter for liquid crystal display was observed by an optical microscope, and as a result, defects such as color mixing, color unevenness, and the peeling and cracks of the protective layer were not confirmed.

EXAMPLE 3

The same procedure as in Example 2 was carried out except that printing was directly done on a glass substrate by the use of the same inks as in Example 2 without applying any resin composition as an ink receiving layer, thereby preparing a color filter.

The thus prepared color filter for liquid crystal display was observed by an optical microscope, and as a result, defects such as color mixing, color unevenness, and the peeling and cracks of the protective layer were not confirmed.

EXAMPLE 4

A glass substrate provided with black matrices was spin-coated with a photosetting resin composition comprising polyvinylpyrrolidone and a bisazide compound so as to make a film thickness of 2 µm, and prebaking was then carried out at 90° C. for 20 minutes to form a photo-curable resin composition layer. Next, the resin layer was colored in a matrix pattern of R, G and B by an ink jet head.

In this example, there were used inks each comprising a R, G or B dye, a water-soluble organic solvent, water and 5% by weight of a self-crosslinkable acrylic acid-acrylic ester emulsion.

After the coloring with these inks, the resin film was subjected to overall exposure by UV irradiation and a heat treatment at 230° C. for 1 hour to partially cure the colored portions and the resin composition. At this time, a residual ratio of uncured portions in the colored portions was 5%.

The thus partially cured resin composition was further spin-coated with a two-pack thermosetting type resin material so as to make a film thickness of 1 µm, and a heat treatment was then carried out at 230° C. for 30 minutes to cure the colored portions and the resin layer, thereby preparing a color filter for liquid crystal display.

The thus prepared color filter for liquid crystal display was observed by an optical microscope, and as a result, defects such as color mixing, color unevenness, and the peeling and cracks of the protective layer were not confirmed.

EXAMPLE 5

The same procedure as in Example 4 was carried out except that there were used inks each comprising a R, G or B pigment, water, a water-soluble organic solvent, 4% by weight of acrylic acid monomer and 1% by weight of bisazide, and after printing, overall exposure by UV irradiation and a heat treatment at 230° C. for 1 hour were done to partially cure the printed portions and the resin composition, thereby preparing a color filter. At this time, a residual ratio of uncured portions in the colored portions was 2.5%.

The thus prepared color filter for liquid crystal display was observed by an optical microscope, and as a result, defects such as color mixing, color unevenness, and the peeling and cracks of the protective layer were not confirmed.

EXAMPLE 6

The same procedure as in Example 4 was carried out except that printing was directly done on a glass substrate by the use of the same inks as in Example 4 without applying any resin composition as an ink receiving layer, thereby preparing a color filter.

The thus prepared color filter for liquid crystal display was observed by an optical microscope, and as a result, defects such as color mixing, color unevenness, and the peeling and cracks of the protective layer were not confirmed.

Using the above-mentioned color filter, serial operations such as the formation of ITO, the formation of orientation film and the enclosing of a liquid crystal material were carried out to prepare such a color liquid crystal display panel as shown in FIG. 3.

A device in which the thus prepared color liquid crystal display panel was used was continuously driven at a temperature range of from −20° to 60° C. for 1,000 hours, and in this case, there was no problem.

In addition, the color liquid crystal display panel was installed on OHP, and this OHP was continuously driven for projection for a period of 10,000 hours. In this case, any change of transmittance and color tone was not confirmed.

Comparative Example 1

The same procedure as in Example 1 was carried out except that colored portions were completely cured prior to the coating of a resin composition for the formation of a protective layer, thereby preparing a color filter.

The thus prepared color filter for liquid crystal display was observed by an optical microscope, and as a result, defects such as the peeling and cracks of the protective layer were confirmed.

The employment of a method for manufacturing a color filter for liquid crystal display of the present invention permits providing a highly reliable color filter for liquid crystal display at low cost which do not give rise to defects such as color mixing, color unevenness, and the peeling and cracks of the protective layer.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A method for manufacturing a color filter which comprises forming a colored pattern on a substrate by imparting energy-curable inks of different colors, comprising the steps of:
   (1) imparting, to the substrate, the energy-curable inks to form a colored pattern,
   (2) applying the energy to the substrate to partially cure the inks applied to the substrate,
   (3) forming an energy-curable resin layer over the substrate, and
   (4) curing the inks and the resin layer by the application of the energy.

2. The method for manufacturing the color filter according to claim 1, wherein said energy in the step (2) or (4) is light or heat.

3. The method for manufacturing the color filter according to claim 1, wherein each of said inks comprises an ultraviolet-curable resin.

4. The method for manufacturing the color filter according to claim 1, wherein a residual ratio of uncured portions of the inks in the step (2) is in the range of 0.5 to 10%.

5. The method for manufacturing the color filter according to claim 1, wherein the inks are applied to the substrate by an ink jet system.

6. A method for manufacturing a color filter which comprises forming a colored pattern on a substrate by imparting energy-curable inks of different colors, comprising the steps of:
   (1) imparting, to the substrate provided with a first resin layer, the energy-curable inks to form a colored pattern,
   (2) applying the energy to the substrate to partially cure the inks applied to the first resin layer,
   (3) forming a second energy-curable resin layer on the first resin layer, and
   (4) curing the inks and the second resin layer by the application of the energy.

7. The method for manufacturing the color filter according to claim 6, wherein said energy in the step (2) or (4) is light or heat.

8. The method for manufacturing the color filter according to claim 6, wherein each of said inks comprises an ultraviolet-curable resin.

9. The method for manufacturing the color filter according to claim 6, wherein a residual ratio of uncured portions of the inks in the step (2) is in the range of 0.5 to 10%.

10. The method for manufacturing the color filter according to claim 6, wherein the inks are applied to the substrate by an ink jet system.

11. The method according to claim 1, wherein the substrate has a black matrix.

12. The method according to claim 11, wherein inks of different colors are imparted to the substrate so as not to overlap each other.

13. The method according to claim 1, wherein each of said inks comprises an acrylic resin, an epoxy resin or a melamine resin.

14. The method according to claim 1, wherein a residual ratio of uncured portions of the inks in the step (2) is in the range of 0.5 to 5%.

15. The method according to claim 11, wherein the inks are applied to light-transmittable portions between black matrices.

16. The method according to claim 1, wherein inks of red, green and blue colors are applied.

17. The method according to claim 6, wherein the substrate has a black matrix.

18. The method according to claim 17, wherein inks of different colors are imparted to the substrate so as not to overlap each other.

19. The method according to claim 6, wherein each of said inks comprises an acrylic resin, an epoxy resin or a melamine resin.

20. The method according to claim 6, wherein a residual ratio of uncured portions of the inks in the step (2) is in the range of 0.5 to 5%.

21. The method according to claim 17, wherein the inks are applied to light-transmittable portions between black matrices.

22. The method according to claim 6, wherein inks of red, green and blue colors are applied.

23. The method according to claim 6, wherein the first resin layer comprises an acrylic resin, an epoxy resin or an imide resin.

* * * * *